United States Patent [19]

Masuda et al.

[11] Patent Number: 4,516,163
[45] Date of Patent: May 7, 1985

[54] DIGITAL INFORMATION SIGNAL RECORDING SYSTEM

[75] Inventors: Isao Masuda, Sagamihara; Nobuaki Takahashi, Yamato; Kazunori Nishikawa, Machida; Yoshiki Iwasaki, Yokohama; Shoji Ueno, Zama, all of Japan

[73] Assignee: Victor Company of Japan, Japan

[21] Appl. No.: 508,540

[22] Filed: Jun. 28, 1983

[30] Foreign Application Priority Data

Jul. 6, 1982 [JP] Japan .................. 57-117377

[51] Int. Cl.³ ..................... G11B 5/00; G11B 5/09
[52] U.S. Cl. ................................... 360/32; 360/40
[58] Field of Search ............... 360/39, 32, 40; 375/26; 371/37

[56] References Cited

U.S. PATENT DOCUMENTS

4,466,089 8/1984 Wachi ..................................... 360/32
4,467,373 8/1984 Taylor et al. ........................... 360/32

Primary Examiner—Vincent P. Canney
Attorney, Agent, or Firm—Andrus, Sceales, Starke & Sawall

[57] ABSTRACT

A digital information recording system comprises a randomized digital signal forming circuit for forming a randomized digital signal by carrying out modulo-2 addition of at least digital information signals of a plurality of channels in a digital signal and a random code sequence which is generated independently, a detector for successively detecting values of each of a predetermined number of words from each of the digital information signals of a plurality of channels in the randomized digital signal, in terms of one word, and generating a detection signal only when values of bits in the one word are all "1" or all "0", a timing circuit for generating a timing signal for every period corresponding to a transmission period of a least significant bit in one word from each of the digital information signals of a plurality of channels, a polarity inverting circuit for passing the randomized digital signal unchanged during a period in which the detection signal is not generated from the detector, and inverting the polarity of the least significant bit in one word from each of the digital information signals of a plurality of channels in the randomized digital signal when simultaneously applied with the detection signal and the timing signal, and a recording circuit for recording a digital signal obtained from the polarity inverting circuit.

6 Claims, 16 Drawing Figures

DIGITAL INFORMATION SIGNAL RECORDING SYSTEM

BACKGROUND OF THE INVENTION

The present invention generally relates to digital information signal recording systems for recording digital information signals onto recording mediums, and more particularly to a recording system for recording digital audio information data which is obtained by subjecting audio signals to digital pulse modulation, onto a recording medium, by inverting a least significant bit (LSB) in one word of the digital audio information data when the bits in that one word are all "0" or all "1".

Generally, systems for recording an analog information signal onto a rotary recording medium (hereinafter simply referred to as a disc) as a digital information signal and reproducing the recorded signal as the original analog information signal, have been reduced to practice. When recording, the analog information signal such as an audio signal and a video signal is subjected to a digital pulse modulation such as a pulse code modulation (PCM), and formed into a digital signal. This digital signal is recorded onto the disc as variations in geometrical configuration constituted by rows of intermittent pits. When reproducing the recorded digital signal from the disc, variation in the intensity of light reflected from the disc or variations in electrostatic capacitance between the disc and a reproducing element is detected, to read and reproduce the recorded digital signal from the disc. Especially when the disc is of the electrostatic capacitance type from which the recorded digital signal is detected as variations in electrostatic capacitance between the disc and the reproducing element, the recorded digital signal can be reproduced within a wide band. That is, in the electrostatic capacitance type disc, it is possible to reserve a capacity for transmitting digital information data of 16 bits in four channels. Moreover, because it is possible to obtain a sufficiently wide transmission band according to the electrostatic capacitance type disc, it is advantageous in data transmission to carry out a frequency modulation which is hardly affected by dropout and level fluctuation.

As a data format for frequency-modulating the above digital signal and then recording the frequency modulated signal, the Non-Return-To-Zero (NRZ) format is advantageous in effectively using the band. However, the maximum number of continuous bits all containing "0" or all containing "1" may become large according to the information which is to be transmitted.

For example, one word from each of the 4-channel digital information data are added with a synchronizing signal, an error detecting code, and an error correcting code, to constitute a signal of one frame. Thus, the digital signal is a signal in which the signals in terms of one frame are time-sequentially multiplexed. Generally, a detection signal obtained by detecting edge portions of the digital signal reproduced from the disc, is used to form a clock signal which acts as a reference signal when reading the recorded data. However, if the data format of the digital signal is the NRZ format described before, a case where all or a majority of the bits in the 4-channel information data continuously assume the value "0" or continuously assume the value "1" occurs quite frequently. In such a case, edge portions do not exist in the digital signal. Thus, in such a case, it becomes difficult to obtain a clock pulse which is stably synchronized with the edge portions of the digital signal, and in extreme cases, the bits become out of synchronism.

It is possible to obtain a clock pulse which is stably synchronized with the edge portions of the digital signal when reproducing the digital signal from the disc, by first modulating the digital signal by a self-clocking modulation system (a bi-phase code modulation and the like, for example) and secondly frequency-modulating the modulated digital signal to record the frequency modulated digital signal. However, the digital signal which is modulated by the self-clocking modulation system has a frequency spectrum in which the energy is distributed largely in the high frequency range. On the other hand, the digital signal obtained from a frequency demodulator which demodulates the frequency modulated digital signal reproduced from the disc, has considerable noise in the high frequency range of its frequency spectrum where the energy is largely distributed. As is well known, this is because the noise spectrum of the frequency demodulation is such that the noise increases with respect to higher frequency components. This noise spectrum is the so-called triangle noise. Accordingly, there was a disadvantage in this method of recording the digital signal, in that there is considerable effect due to degradation in the signal-to-noise (S/N) ratio in the high frequency range. In addition, the hardware required for demodulating the digital signal which has been modulated by the self-clocking modulation system, was bulky and expensive compared to the hardware required with respect to the digital signal of the NRZ format described before.

Accordingly, the present assignee has proposed a system for recording the NRZ signal at random in a Japanese Patent Application No. 56-120359 (Japanese Laid-Open Patent Application No. 58-23310). According to this proposed digital information signal recording system, one block of signals is constituted by one word from each of the 4-channel digital information data, an 8-bit synchronizing signal having a fixed pattern, two kinds of error correcting codes, an error detecting code, and a 1-bit control signal for use upon random access and the like. The digital signal in this case, is a digital signal of the NRZ format in which signals in terms of one block are time-sequentially multiplexed. This digital signal is subjected to modulo-2 addition with a maximum length sequence generated from a generator polynomial $x^7 + x^4 + 1$, for example. The digital signal obtained as a result of this modulo-2 addition is a randomized signal (this randomizing of the signal is called "scrambling"), and this scrambled signal is thereafter frequency-modulated and recorded onto the disc.

According to this proposed recording system, even when the bits in one word of the original information data are all "0" or all "1", the possibility of another value, that is, "1" or "0", existing within one word of the digital signal which is obtained by scrambling the data increases. In addition, the digital signal obtained by scrambling the data, has a frequency spectrum in which the energy is largely distributed in the low frequency range, as compared to the frequency spectrum of the digital signal which is obtained by the self-clocking modulation system. For this reason, compared to the case where the digital signal of he NRZ format is reproduced, it is possible to obtain a clock pulse which is more stably in synchronism with the edge portions of the digital signal when reproducing a disc recorded according to the above recording system proposed by the present assignee. Further, compared to the case where the digital signal modulated by the self-clocking modulation system is reproduced, the effect due to degradation in the S/N ratio in the high frequency range upon frequency demodulation can be reduced according to this proposed recording system. Moreover, it is possible to demodulate the digital signal of the NRZ format before it is scrambled, by use of an inexpensive circuit.

However, it has been confirmed that even when the data is scrambled by the maximum length sequence which is generated from the generator polynomial described before, there are cases where all of the bits in one word from each of the 4-channel information data within a signal corresponding to one block of the scrambled digital signal, continuously assume the value "0" or continuously assume the value "1". Hence, in such a case, the edge portions of the reproduced digital signal cannot be detected continuously for at least an interval corresponding to the transmission period of one word, and the clock information cannot be obtained. In order to obtain a clock pulse even in such a case, a tank circuit and a phase locked loop (PLL) coupled at a stage subsequent to the circuit which detects the edge portions of the reproduced digital signal, must have a considerably high accuracy. However, if such a tank circuit and PLL having high accuracy are employed, the cost of the reproducing apparatus became high.

SUMMARY OF THE INVENTION

Accordingly, it is a general object of the present invention to provide a novel and useful digital information signal recording system in which the above described disadvantages have been overcome.

Another and more specific object of the present invention is to provide a recording system which successively detects the value of one word in each specific number of words in a digital information signal of a plurality of channels within a randomized digital signal, inverts the polarity of an LSB of one word if all of the bits in that one word continuously assume a value "1" or continuously assume a value "0", makes no change if all of the bits in that one word assume the values of "1" and "0" in a mixed manner, and records the digital signal thus obtained. According to the recording system of the present invention, because the recording is carried out by inverting the value of the LSB in one word if all of the bits in that one word continuously assume the value of "1" or continuously assume the value "0", each of the words in the digital information signal within the reproduced digital signal which is supplied to a clock reproducing circuit of a reproducing apparatus, are all constituted from the values "1" and "0". Accordingly, the clock information is supplied to the clock reproducing circuit for every one word. For this reason, it is possible to form a clock signal which is stably in synchronism with edge portions of the digital signal, by the clock reproducing circuit. In addition, bit synchronism can be ensured without the use of expensive circuit elements which provide high accuracy, and as a result, efficient data transmission can be carried out according to the recording system of the present invention.

Other objects and further features of the present invention will be apparent from the following detailed description when read in conjunction with the accompanying drawings.

DETAILED DESCRIPTION

Figure 1:
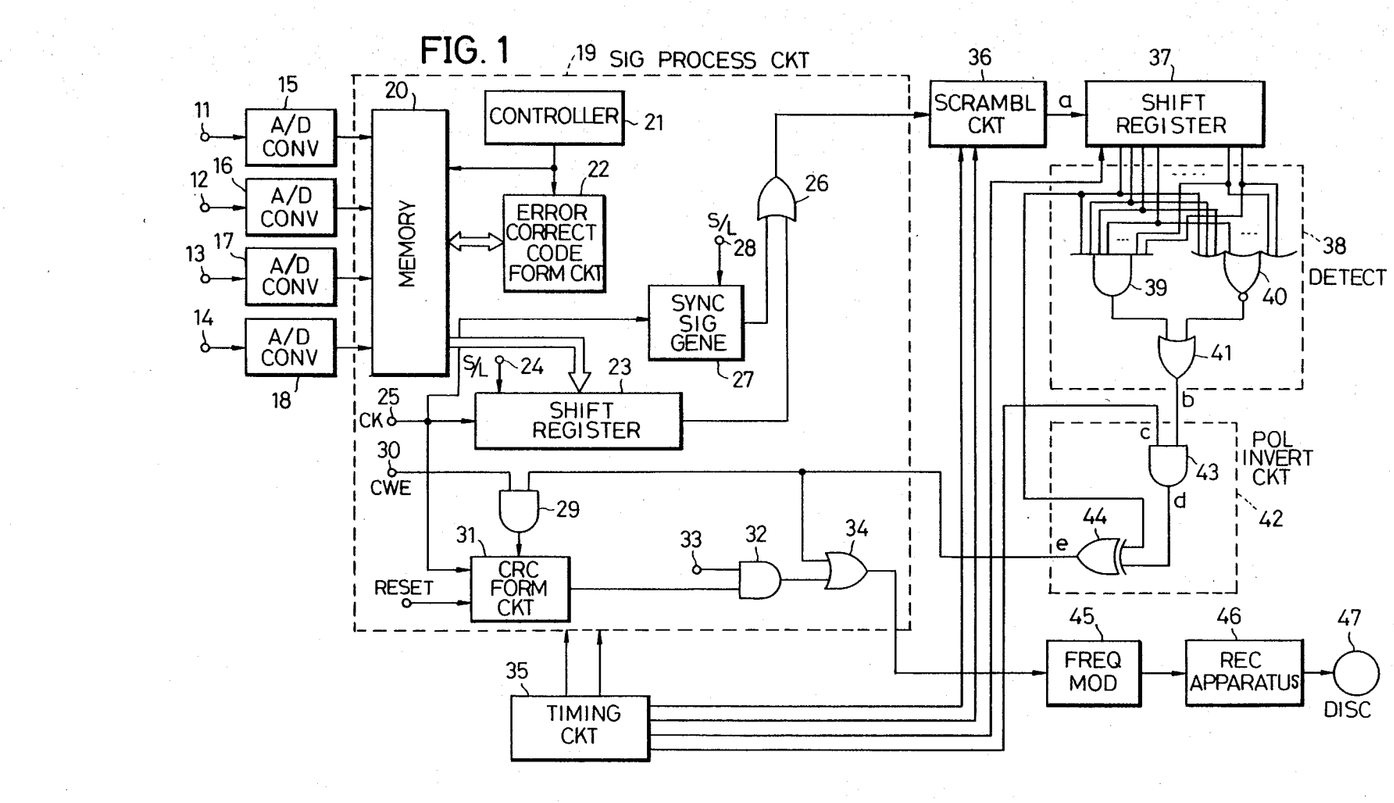
FIG. 1 is a systematic circuit diagram showing an embodiment of a recording system according to the present invention.

In FIG. 1, audio signals of four channels, are independently applied to input terminals 11 through 14. The audio signals thus applied to the input terminals 11 through 14, are respectively sampled at a sampling frequency of 44.1 kHz, for example, and quantized to be converted into digital audio signals (PCM audio signals) having a quantization number of 16 bits, in corresponding analog-to-digital (A/D) converters 15 through 18. These digital audio signals are respectively supplied to a memory 20 within a signal processing circuit 19.

The digital signals of four channels which are respectively stored in the memory 20, are read out from the memory 20 under control of a controller 21, and supplied to an error correcting code forming circuit 22. The error correcting code forming circuit 22 generates two kinds of error correcting codes according to a generator polynomial which will be described hereinafter. These error correcting codes are used to correct code errors in the 4-channel digital information data, which code errors are introduced due to dropout and the like caused by dust particles and the like on the recording surface of the disc.

The two kinds of error correcting codes are supplied to the memory 20 and written into the memory under the control of the controller 21. Digital data consisting of a total of 96 bits is read out from the memory 20 in parallel for every predetermined period, and the 96-bit digital data is supplied to a 96-bit shift register 23. The 96-bit digital data comprises one word of digital information data from each of the 4-channel digital audio signals which are rearranged of their transmission sequence, where one word from each of the 4-channel digital audio signals consists of 16 bits, and the two kinds of error correcting codes consisting of 16-bits each.

Figure 2:
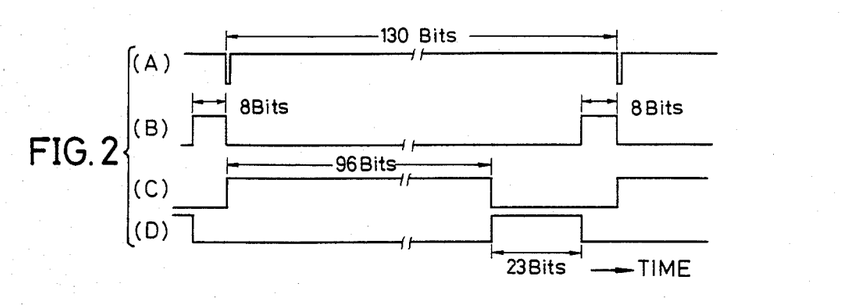
FIGS. 2(A) through 2(D) are time charts of signals for explaining the operation of a signal processing circuit in the circuit system shown in FIG. 1.

A pulse shown in FIG. 2(A) which is formed by a timing circuit 35, is supplied to an input terminal 24 of the shift register 23. The 96-bit digital data read out from the memory 20 is loaded into the shift register 23 during a low-level period of this pulse. During a high-level period of this pulse supplied to the input terminal 24, the shift register 23 carried out a shifting operation according to a clock pulse having a frequency of 5.733 MHz, for example which is formed by the timing circuit 35 and supplied to an input terminal 25. The 96-bit digital data which is read out in series due to the shifting operation of the shift register 23, is supplied to an OR circuit 26.

On the other hand, a control pulse shown in FIG. 2(B) which is formed by the timing circuit 35, is supplied to an input terminal 28 of a synchronizing signal generating circuit 27. The synchronizing signal generating circuit 27 generates a synchronizing signal in series during a high-level period of this control pulse, and stops generating the synchronizing signal during a low-level period of the control pulse. The high-level period of the control pulse shown in FIG. 2(B) corresponds to a transmission period in which eight bits are transmitted immediately before the period in which the 96-bit digital data is read out from the shift register 23 in series. Accordingly, during the high-level period of the control pulse shown in FIG. 2(B), the synchronizing signal generating circuit 27 reads out an 8-bit synchronizing signal having a fixed pattern of "10111000", for example, and supplies this synchronizing signal to the OR circuit 26.

As a result, a signal in which the 96-bit digital data is time-sequentially multiplexed subsequent to the 8-bit synchronizing signal with a period corresponding to a transmission period of 130 bits, is obtained from the OR circuit 26 and supplied to a scrambling circuit 36.

Figure 4:
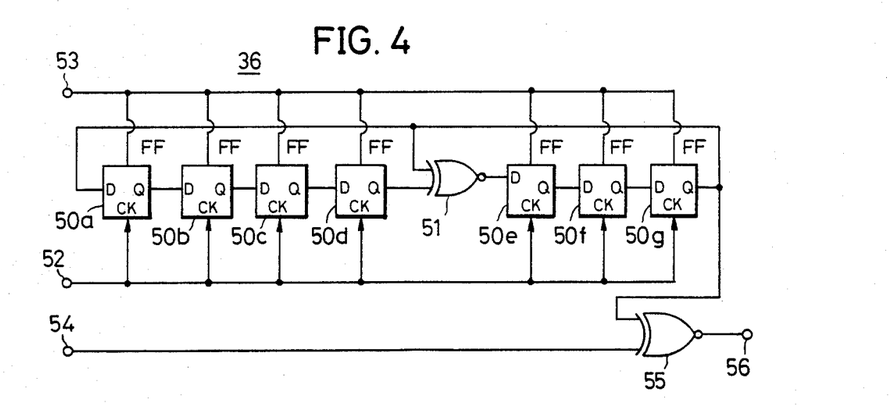
FIG. 4 is a circuit diagram showing an embodiment of a scrambling circuit in the circuit system shown in FIG. 1.

For example, the scrambling circuit 36 has a circuit construction shown in FIG. 4, and comprises a maximum length sequence generating circuit and a 2-input exclusive-OR circuit 55. In order to randomize the input digital signal excluding the synchronizing signal portion thereof, for example, the maximum length sequence generating circuit generates a maximum length sequence which is generated according to a generator polynomial $x^7+x^4+1$ which is an example of a 7th-order random code sequence completing in 127 ($=2^7-1$). This maximum length sequence generating circuit comprises delay type (D-type) flip-flops 50a through 50g, and an exclusive-OR circuit 51. The maximum length sequence generated by the above maximum length sequence generating circuit and the input digital signal, are supplied to the exclusive-OR circuit 55. The flip-flops 50a through 50d are connected in series, and a Q-output terminal of the flip-flop 50d is supplied to one input terminal of the exclusive-OR circuit 51. On the other hand, an output terminal of the exclusive-OR circuit 51 is connected to a data input terminal D of the flip-flop 50e. The flip-flops 50e through 50g are connected in series. A Q-output terminal of the flip-flop 50g is connected to a data input terminal D of the flip-flop 50a, to one input terminal of the exclusive-OR circuit 55, and to the other input terminal of the exclusive-OR circuit 51. The other input terminal of the exclusive-OR circuit 55 is connected to an input terminal 54. A clock pulse shown in FIG. 5(A) which is generated by the timing circuit 35, is applied to an input terminal 52. This clock pulse obtained through the input terminal 52, is supplied to respective clock terminals of the flip-flops 50a through 50g.

Figure 5:
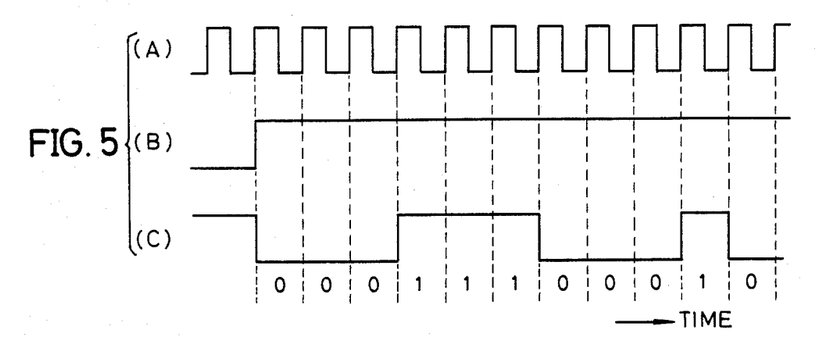
FIGS. 5(A) through 5(C) are time charts of signals for explaining the operation of the circuit shown in FIG. 4.

A control signal shown in FIG. 5(B) which is formed in the timing circuit 35, is supplied to respective preset terminals of the flip-flops 50a through 50g, through an input terminal 53. Q-outputs of the flip-flops 50a through 50g respectively assume low level (logic "0") with a rise in the clock pulse applied thereto, when the control signal applied to the respective preset terminals of these flip-flops 50a through 50g assumes high level. With a subsequent rise in the clock pulse applied to the flip-flops 50a through 50g, the Q-output of only the flip-flop 50e assumes high level (logic "1"). With another subsequent rise in the clock pulse, the Q-outputs of only the flip-flops 50e and 50f assume high level, and with still another subsequent rise (fourth rise) in the clock pulse, the Q-outputs of only the flip-flops 50e through 50g assume high level. Similarly thereafter, the Q-outputs of the flip-flops 50f, 50g, and 50a assume high level with the fifth rise in the clock pulse, the Q-outputs of the flip-flops 50g, 50a, and 50b assume high level with the sixth rise in the clock pulse, the Q-outputs of the flip-flops 50a through 50c assume high level with the seventh rise in the clock pulse, the Q-outputs of the flip-flops 50b through 50e assume high level with the eighth rise in the clock pulse, and the Q-outputs of the flip-flops 50c, 50d, and 50f assume high level with the ninth rise in the clock pulse.

The Q-outputs of the flip-flops 50a through 50g undergo similar level change with every rise in the clock pulse shown in FIG. 5(A). As a result, a maximum length sequence shown in FIG. 5(C) which is in accordance with the generator polynomial $x^7+x^4+1$, is generated through the Q-output of the flip-flop 50g in series, and supplied to one input terminal of the exclusive-OR circuit 55. The digital signal to be recorded which is obtained from the OR circuit 26 described before, is supplied to the other input terminal of the exclusive-OR circuit 55 through the input terminal 54. Thus, a modulo-2 addition is carried out between the digital signal to be recorded and the maximum length sequence, with respect to corresponding bits. As a result, a digital signal shown in FIG. 6(A), for example, which has a scrambled waveform, is produced through an output terminal 56.

A digital signal a thus scrambled in the scrambling circuit 36, is supplied to a 16-bit shift register 37 wherein the digital signal a is shifted according to a timing pulse obtained from the timing circuit 35 and subjected to series-to-parallel conversion. A 16-bit parallel output of the shift register 37 is supplied to a detector 38 wherein detection is carried out to determine whether the 16 bits constituting one word are all "0" or all "1". In addition, the scrambled digital signal a is supplied to a polarity inverting circuit 42 from an LSB terminal of the shift register 37. The detector 38 comprises an AND circuit 39 supplied with the 16-bit parallel output of the shift register 37, a NOR circuit 40 supplied with the 16-bit parallel output of the shift register 37, and an OR circuit 41 supplied with outputs of the AND circuit 39 and the NOR circuit 40. Detection with respect to whether the 16 bits are all 37 1" is carried out by the AND circuit 39 and the OR circuit 41. On the other hand, detection with respect to whether the 16 bits are all "0" is carried out by the NOR circuit 40 and the OR circuit 41.

When the digital data is scrambled by the maximum length sequence which is generated according to the generator polynomial described before, an error correcting code P shown in FIG. 3 is generated according to the same generator polynomial. It has been confirmed that among the information data in the 9-th bit through the 104-th bit shown in FIG. 3, there is a possibility that the bits are all continuously "0" or all continuously "1" within the data in a total of 65 bits from the 9-th through the 73-rd bit (that is, the digital data in the four positions Ch-1 through Ch-4 and the most significant bit (MSB) of the error correcting code P).

Figure 6:
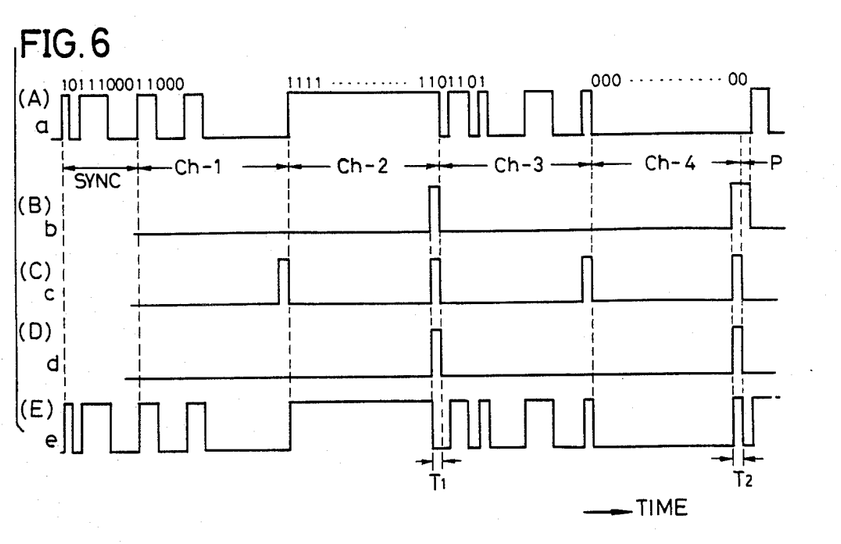
FIGS. 6(A) through 6(E) are time charts of signals for explaining the operation of the circuit system shown in FIG. 1.

Accordingly, the scrambled digital signal a may be a signal in which the information data of the second channel in the 16 bits arranged at the position Ch-2 are all "1" and the information data of the fourth channel in the 16 bits arranged at the position Ch-4 are all "0", as shown in FIG. 6(A). In this case, the detector 38 produces a high-level detection signal b shown in FIG. 6(B) when applied with the LSB of the information data of the second channel arranged at the position Ch-2. Moreover, the detector 38 also produces the high-level detection signal b when applied with the LSB of the information data of the fourth channel arranged at the position Ch-4. As described before, the scrambling of data is carried out by the modulo-2 addition of the maximum length sequence and the data. Thus, when the 16-bit original information data assumes values different from the maximum length sequence, the 16 bits all become "1". On the other hand, if the 16-bit original information data assumes the same values as the maximum length sequence, the 16 bits all become "0". Accordingly, in the above case, the original information data of the second channel before the scrambling, is a data which is of an inverted polarity with respect to the value "1011010000010101" which corresponds to the 17-th bit through the 32-nd bit of the maximum length sequence. Further, the original information data of the fourth channel before the scrambling, is a data which is the same as the value "0001101010011001" which corresponds to the 49-th bit through the 64-th bit of the maximum length sequence.

The detection signal b from the detector 38, indicating that the 16 bits are all "0" or all "1", is applied to one input terminal of an AND circuit 43 within the polarity inverting circuit 42. A pulse c shown in FIG. 6(C) which is generated from the timing circuit 35, is supplied to the other input terminal of the AND circuit 43. This pulse c is generated in correspondence with a transmission period of one bit (time slot) in which the LSB of one word in each of the 4-channel information data within the signal corresponding to one frame is transmitted. Accordingly, the AND circuit 43 generates a pulse d shown in FIG. 6(D) which assumes high level only when both the detection signal b and the pulse c are applied simultaneously to the AND circuit 43. This pulse d is applied to one input terminal of a 2-input exclusive-OR circuit 44 within the polarity inverting circuit 42.

The digital signal a described before, is applied to the other input terminal of the exclusive-OR circuit 44 in series, through the LSB output terminal of the shift register 37. Thus, the exclusive-OR circuit 44 inverts the polarity of the input digital signal a only during the high-level period of the pulse d. During the low-level period of the pulse d, the exclusive-OR circuit 44 does not invert the polarity of the input digital signal a, and passes the input digital signal a unchanged of its polarity. Hence, when the digital signal a shown in FIG. 6(A) is applied to the shift register 37, the pulse d is generated when the LSB of the information data in the second channel in which one word is constituted solely by the value "1" is applied to the exclusive-OR circuit 44. Thus, in this case, the exclusive-OR circuit 44 inverts the value "1" of the LSB into the value "0" as indicated by T1 in FIG. 6(E). Further, the pulse d is generated again when the LSB of the information data in the fourth channel in which one word is constituted solely by the value "0" is applied to the exclusive-OR circuit 44, and the exclusive-OR circuit 44 inverts the value "0" of the LSB into the value "1" as indicated by T2 in FIG. 6(E). As described above, the exclusive-OR circuit 44 does not invert the polarity of the digital signal a applied to one of its input terminals during the low-level period of the pulse d which is applied to its other input terminal. Therefore, the exclusive-OR circuit 44 produces a digital signal e having a waveform shown in FIG. 6(E). This digital signal e is supplied to one input terminal of an AND circuit 29 and one input terminal of an OR circuit respectively within the signal processing circuit 19.

A control pulse shown in FIG. 2(C) which is generated from the timing circuit 35, is supplied to the other input terminal of the AND circuit 29 through an input terminal 30. The output digital signal e of the exclusive-OR circuit 44 is passed through the AND circuit 29 only during the high-level period of this control pulse from the timing circuit 35, and the digital signal e which passes through the AND circuit 29 is supplied to a CRC forming circuit 31. The high-level period of the control pulse shown in FIG. 2(C) corresponds to the period in which the 96-bit digital data is read out from the shift register 23, and is a period in which the 96-bit digital data consisting of the two kinds of error correcting codes and the 4-channel information data within the digital signal e which is obtained from the exclusive-OR circuit 44. This means that this 96-bit digital data is supplied to the CRC forming circuit 31.

The CRC forming circuit 31 is a circuit in which the 96-bit digital data supplied thereto is divided by a generator polynomial $x^{23}+x^5+x^4+x+1$, and produces a 23-bit remainder as the error detecting code (CRC). One bit of this error detecting code CRC is produced from the CRC forming circuit 31 every time the clock pulse described before is supplied to the CRC forming circuit 31 through the input terminal 25, and then supplied to an input terminal of an AND circuit 32. A pulse shown in FIG. 2(D) which is generated from the timing circuit 35, is supplied to the other input terminal of the AND circuit 32 through an input terminal 33. The AND circuit 32 passes the error detecting code CRC only during the transmission period of 23 bits when the pulse obtained through the input terminal 33 assumes high-level, so that the error detecting code CRC is supplied to the OR circuit 34. The high-level period of the pulse obtained through the input terminal 33 is the transmission period of 23 bits immediately after the transmission of the 96-bit digital data, as seen from FIG. 2(D). As a result, the OR circuit 34 produces a digital signal in which the error detecting code CRC is time-sequentially multiplexed subsequent to the 96-bit digital data e. The circuit part from the memory 20 to the OR circuit 34 described heretofore, constitute the signal processing circuit 19.

The CRC forming circuit 31 is reset by a reset pulse generated from the timing circuit 35, during a transmission period of 8 bits from a point when the pulse shown in FIG. 2(D) assumes low level up to a point when the pulse shown in FIG. 2(C) assumes high level. In addition, although illustration thereof is omitted in FIG. 1, a 1-bit address information which is produced independently for indicating a track position for use upon random access and the like, is supplied to the OR circuit 34 immediately subsequent to the completion of the transmission of the error correcting code CRC.

Figure 3:
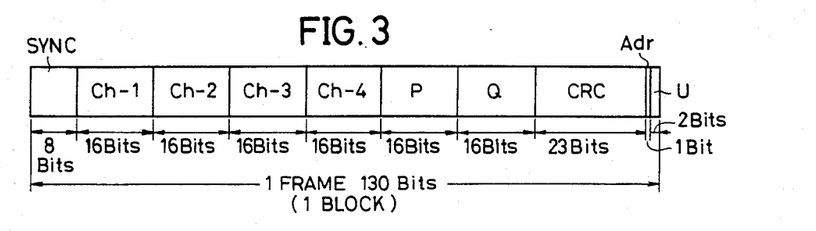
FIG. 3 diagrammatically shows an example of a format of a digital signal.

Accordingly, a digital signal in which a signal having a signal format shown in FIG. 3 which corresponds to one frame (one block) is time-sequentially multiplexed in terms of frames, is obtained from the OR circuit 34. In FIG. 3, an 8-bit synchronizing signal having a fixed pattern for indicating the beginning of a frame, is represented by SYNC. The positions of the 16-bit 4-channel digital information signals are respectively indicated by Ch-1 through Ch-4. For example, the 4-channel digital information signals may be two kinds of 2-channel digital audio signals, or 4-channel digital audio signals, and the position Ch-1 through Ch-4 respectively indicate multiplexed positions of one word in the signals of each channel. The two kinds of 16-bit error correcting codes described before, are respectively represented by P and Q. The error correcting codes P and Q are generated from the 16-bit data of each of the four channels, according to the following generator equations.

$$P = W1 \oplus W2 \oplus W3 \oplus W4$$

$$Q = T^4 \cdot W1 \oplus T^3 \cdot W2 \oplus T^2 \cdot W1 \oplus T \cdot W4$$

In the above generator equations, W1, W2, W3, and W4 are the 16-bit digital signals arranged at the positions Ch-1 through Ch-4 (normally, these digital signals are signals in mutually different frames), T indicates a companion matrix of a predetermined polynomial, and a symbol "$\oplus$" represents a modulo-2 addition between corresponding bits. The above generator equations are only one example of such generator equations.

The 23-bit error detecting code CRC is indicated by CRC in FIG. 3. This error detecting code CRC is a 23-bit remainder obtained when each of the information data arranged in the positoins Ch-1 through Ch-4 and the error correcting codes P and Q which correspond to the 9-th through the 104-th bit in FIG. 3, is divided by the generator polynomial $X^{23} + x^5 + x^4 + x + 1$, for example. It is detected that there is no error when the remainder is zero. In addition, a bit Adr corresponds to one bit of a 196-bit control signal which is used for operations such as a random access, and this 196-bit control signal is transmitted by 196 frames of the digital signal. Further, two bits indicated by U in FIG. 3 correspond to so-called users' bits which are reserved for possible future use.

One frame of the above digital signal comprising a total of 130 bits from the synchronizing signal SYNC to the users' bits U, has a repetition frequency of 44.1 kHz which is equal to the sampling frequency, for example. The digital signal is multiplexed in terms of frames and supplied to a frequency modulator 45 in series with a transmission bit rate of 5.733 Mb/sec. A frequency modulated signal obtained by frequency-modulating a carrier having a frequency in the range of 7 MHz, for example, by the above digital signal, is obtained from the frequency modulator 45 and supplied to a recording apparatus 46. The frequency modulated signal supplied to the recording apparatus 46, is converted into a modulated laser beam by a known light modulator which is supplied with a laser beam. This modulated laser beam is caused to converge on the surface of an original disc which is coated with a photosensitive agent. The recording apparatus 46 forms a disc 47 by way of known developing process and disc forming process which follow. Accordingly, the output frequency modulated signal of the frequency modulator 45 is recorded as variations in geometrical configuration by the formation of rows of intermittent pits, along a spiral track or concentric tracks on the disc 47.

A more stable operation is ensured by providing a data latch circuit at an output stage of the AND circuit 43 shown in FIG. 1, to latch the pulse d by an inverted clock pulse and transmit the data. In the embodiment described heretofore, description was given with respect to a pattern in which the information data which are arranged at the positions Ch-2 and Ch-4, among the information data in the scrambled digital signal a, are all continuously "1" or all continuously "0" for the respective 16 bits. However, in a case where one word from each of the 4-channel information data arranged at the positions Ch-1 through Ch-4 which amount to a total of 64 bits are all "0" (or all "1"), the polarity of the LSB in each of the four words is inverted according to the present invention.

Figure 7:
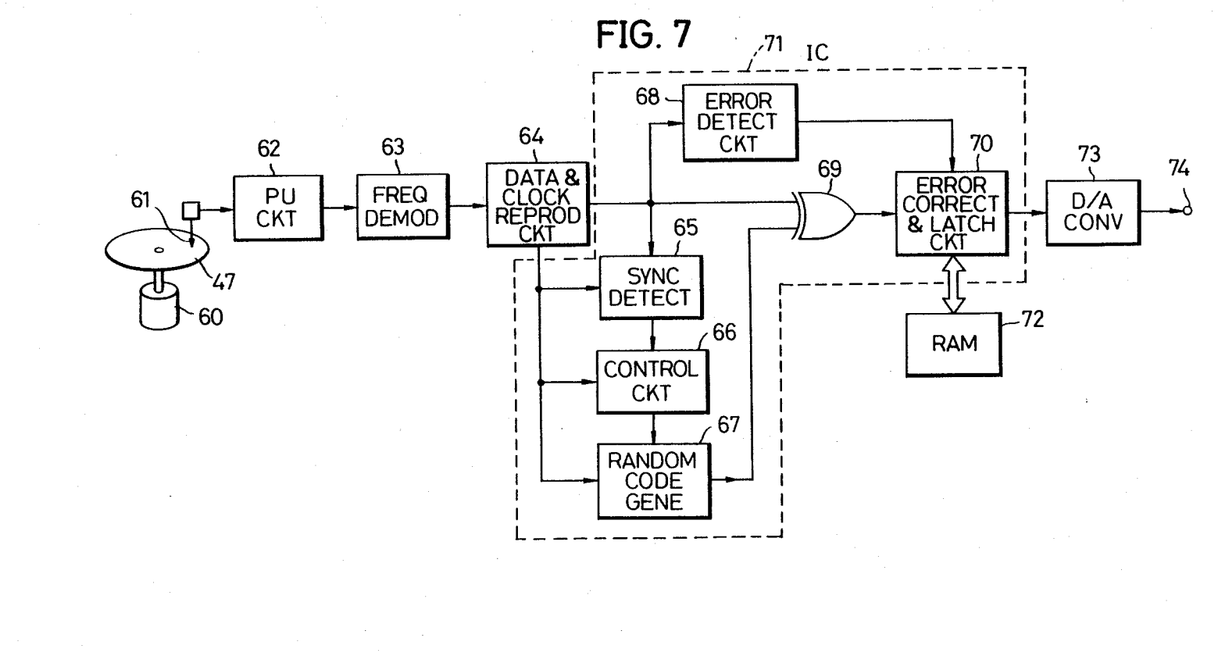
FIG. 7 is a general systematic block diagram showing an essential part of a disc reproducing apparatus.

Next, description will be given with respect to a reproducing apparatus for reproducing a signal from the disc 47 which is recorded according to the recording system of the present invention, by referring to FIG. 7.

The disc 47 is rotated by a motor 60, and the signal recorded on the disc 47 is picked up and reproduced by a pickup device 61. This pickup device 61 may be of a so-called electrostatic capacitance type which picks up the recorded signal as variations in the electrostatic capacitance between the disc 47 and a reproducing element of the pickup device. The pickup device 61 may be of a so-called optical type which picks up the recorded signal by use of a laser beam.

The signal picked up by the pickup device 61, is passed through a pickup circuit 62 which includes a preamplifier, and is supplied to a frequency demodulator 63 wherein the picked up signal is demodulated. A demodulated output of the demodulator 63 is supplied to a data and clock reproducing circuit 64.

The data and clock reproducing circuit 64 obtains the randomized digital signal (data) from the demodulated signal as a predetermined square wave on one hand, and on the other, reproduces (forms) a clock signal from a signal obtained by detecting edge portions of the randomized digital signal. The reproduced clock signal is supplied to a synchronism detecting circuit 65, a random code sequence control circuit 66, and a random code sequence generating circuit 67. The reproduced digital signal is supplied to the synchronism detecting circuit 65, an error detecting circuit 68, and one input terminal of a 2-input exclusive-Or circuit 69. The synchronism detecting circuit 65 detects the synchronizing signal within one frame. Even when a pattern identical to the pattern of the synchronizing signal exists within one frame, this synchronism detecting circuit 65 is designed so as not to erroneously detect such a pattern identical to that of the synchronizing signal. Further, by taking into consideration a case where a signal is missing due to signal dropout and the like, the synchronism detecting circuit 65 discards the data if a predetermined number of synchronizing signals cannot be obtained continuously. A synchronizing signal detection signal produced from the synchronism detecting circuit 65, is supplied to the random code sequence control circuit 66 wherein the detection signal is formed into a control signal. This control signal from the random code sequence control circuit 66 is supplied to the random code sequence generating circuit 67. The random code sequence generating circuit 67 thus generates a random code sequence identical to that upon recording, during a period after the synchronizing signal in which period the data is supplied. This random code sequence generated from the random code sequence generating circuit 67 and the reproduced digital signal are respectively supplied to the exclusive-OR circuit 69 wherein the modulo-2 addition is carried out to restore the digital signal into the original digital signal (NRZ signal). The output digital signal of the exclusive-OR circuit 69 is passed through an error correcting and latch circuit 70, and then supplied to a random access memory (RAM) 72.

The reproduced digital signal thus written into the RAM 72, is read out by rearranging the sequence of the digital signal back to its original sequence, since the digital signal was recorded with its sequence rearranged. The digital signal read out from the RAM 72 is again supplied to the error correcting and latch circuit 70. On the other hand, the signal from the 9-th bit through the 127-th bit in FIG. 3 is divided by the generator polynomial $x^{23}+x^5+x^4+x1$ described before, in the error detecting circuit 68. It is detected that there is no error in the information data within that signal corresponding to one frame, when the remainder is zero. On the contrary, it is detected that there is an error when the remainder is not zero, and in this case, the error correcting circuit 68 causes an error correcting circuit within the error correcting and latch circuit 70 to correct the error in the information data read out from the RAM 72. The error correcting circuit corrects the error and restores the information data, by carrying out modulo-2 addition with respect to each bit of the four data words arranged at the positions Ch-1 through Ch-4 by using the error correcting codes P and/or Q. The error correcting circuit passes the information data unchanged when no error is detected. The four data words having no error or the four restored data words are again written into the RAM 72, and when these four data words are thereafter read out from the RAM 72, these read out data words are latched in the error correcting and latch circuit 70. The latched data words are supplied to a digital-to-analog (D/A) coverter 73. The sequence with which the correction of error and restoration of the information data are carried out, is performed accurately because the output of the RAM 72 is eliminated of its time base fluctuation component. The D/A converter 73 subjects the latched data words to digital-to-analog conversion, and as a result, analog audio signals of four channels are produced in parallel through output terminals 74 through 77.

A circuit part including the circuits 65 through 70 is constructed similarly as a commercially available integrated circuit (IC). Such an IC may be an IC chip YM2126E manufactured by Nippon Gakki Company Ltd. The only difference between the above circuit part and such a commercially available IC, is that the input signal of the error detecting circuit 68 in the block system shown in FIG. 7 is the reproduced digital signal which has been scrambled, while in the commercially available IC, the input signal of the error detecting circuit 68 is a reproduced digital signal corresponding to the NRZ which has been returned to its original form by descrambling (that is, the output signal of the exclusive-OR circuit 69).

In some applications, video information data may be transmitted in one of or both transmission regions for transmitting the information data of two channels, which are indicated by the positions Ch-3 and Ch-4 in FIG. 3. In the case of the audio information data, no serious problems are introduced from the point of audibility by the difference in the LSB, and for this reason, the audio signal can be reproduced from the disc which is recorded according to the recording system of the present invention by the reproducing apparatus shown in FIG. 7. However, in the case of the video information data, the difference in the LSB will have a great effect in the reproduced picture, and for this reason, the system according to the present invention cannot be applied to the video information data. However, even when transmitting the video information data, the audio information data is transmitted at least in the transmission region for transmitting information data of two channels, which are indicated by the positions Ch-1 and Ch-2 shown in FIG. 3. This means that there is a possibility that a maximum number of continuous bits which all assume the same value of "0" or the same value of "1" is equal to 30. Accordingly, the present invention may be applied only with respect to the audio information data excluding the video information data.

In the case of an audio signal, when the quantization of 16 bits is performed, the performance obtained in an ideal state is approximately 96 dB in the dynamic range and distortion of 0.002% with respect to a maximum sinusoidal input. However, in order to fully exhibit such a performance, the cost of the system becomes extremely high and is not practical. In actual practice, the limit of the performance is such that the distortion is in the range of 0.01%.

The scrambling described before, may be carried out inclusive of the synchronizing signal.

Further, the present invention is not limited to these embodiments, but various variations and modifications may be made without departing from the scope of the present invention.

What is claimed is:

1. A digital information recording system comprising:
a randomized digital signal forming circuit for forming a randomized digital signal by carrying out modulo-2 addition of at least digital information signals of a plurality of channels in a digital signal and a random code sequence which is generated independently, said digital signal being constituted by a predetermined number of words from each of said digital information signals of a plurality of channels, a synchronizing signal, error correcting codes, and an error detecting code, which are time-sequentially multiplexed in terms of signals corresponding to one frame, said digital information signals of a plurality of channels being obtained by independently subjecting analog information signals of a plurality of channels to digital modulation;
a detector for successively detecting values of each of said predetermined number of words from each of said digital information signals of a plurality of channels in said randomized digital signal, in terms of one word, and generating a detection signal only when values of bits in said one word are all "1" or all "0";
a timing circuit for generating a timing signal for every period corresponding to a transmission period of a least significant bit in one word from each of said digital information signals of a plurality of channels;
polarity inverting circuit means for passing said randomized digital signal unchanged during a period in which said detection signal is not generated from said detector, and inverting the polarity of the least significant bit in one word from each of said digital information signals of a plurality of channels in said randomized digital signal when simultaneously applied with said detection signal and said timing signal; and recording means for recording a digital signal obtained from said polarity inverting circuit means.

2. A digital information signal recording system as claimed in claim 1 in which said digital information signals, the values of which are detected by said detector, are digital audio data obtained by subjecting audio signals to digital modulation.

3. A digital information signal recording system as claimed in claim 1 in which said detector comprises a shift register supplied with said randomized digital signal from said randomized digital signal forming circuit, for subjecting a signal having bits corresponding to one word from each of said digital information signals of a plurality of channels to series-to-parallel conversion; an AND circuit supplied with a parallel output signal of said shift register; a NOR circuit supplied with the parallel output signal of said shift register; and an OR circuit supplied with output signals of said AND circuit and said NOR circuit.

4. A digital information signal recording system as claimed in claim 1 in which said polarity inverting circuit means comprises an AND circuit supplied with the output signal of said detector and said timing signal, and an exclusive-OR circuit supplied with an output signal of said AND circuit and said randomized digital signal from said randomized digital signal forming circuit.

5. A digital information signal recording system as claimed in claim 1 in which said error detecting code is generated according to said digital information signals of a plurality of channels in said digital signal obtained from said polarity inverting circuit means.

6. A digital information signal recording system as claimed in claim 4 in which said randomized digital signal from said randomized digital signal forming circuit is a signal produced in series from a least significant bit terminal of a shift register, said shift register being supplied with said randomized digital signal from said randomized digital signal forming circuit and subjecting a signal having bits corresponding to one word from each of said digital information signals of a plurality of channels in said randomized digital signal to series-to-parallel conversion.

* * * * *